(12) United States Patent
Bochicchio

(10) Patent No.: US 7,798,402 B2
(45) Date of Patent: Sep. 21, 2010

(54) SYSTEM AND METHOD FOR SHIPPING FREIGHT

(76) Inventor: Joseph M. Bochicchio, 368 Crompton St., Charlotte, NC (US) 28273

( * ) Notice: Subject to any disclaimer, the term of this patent is extended or adjusted under 35 U.S.C. 154(b) by 809 days.

(21) Appl. No.: 11/744,524

(22) Filed: May 4, 2007

(65) Prior Publication Data

US 2007/0210156 A1 Sep. 13, 2007

Related U.S. Application Data

(63) Continuation-in-part of application No. 11/383,826, filed on May 17, 2006, now abandoned, which is a continuation-in-part of application No. 11/247,525, filed on Oct. 11, 2005, now abandoned, which is a continuation-in-part of application No. 10/425,203, filed on Apr. 28, 2003, now Pat. No. 6,983,883.

(60) Provisional application No. 60/376,248, filed on Apr. 29, 2002.

(51) Int. Cl.
 *G06F 19/00* (2006.01)
(52) U.S. Cl. .................................................. 235/385
(58) Field of Classification Search ................ 235/385; 705/22, 23, 28, 330–341
See application file for complete search history.

(56) References Cited

U.S. PATENT DOCUMENTS

| | | | |
|---|---|---|---|
| 4,180,204 A | 12/1979 | Koenig et al. | |
| 4,225,926 A | 9/1980 | Wendt | |
| 4,407,692 A | 10/1983 | Torbeck | |
| 4,420,053 A | 12/1983 | Russo | |
| 4,421,186 A | 12/1983 | Bradley | |
| 4,462,045 A | 7/1984 | Norris | |
| 4,605,081 A | 8/1986 | Helmly et al. | |
| 4,638,876 A | 1/1987 | Balduin et al. | |
| 4,666,004 A | 5/1987 | Raz | |
| 832,204 A | 5/1989 | Handy et al. | |
| 4,832,204 A | 5/1989 | Handy et al. | |
| 4,899,840 A | 2/1990 | Boubille | |
| 5,072,400 A | 12/1991 | Manduley | |
| 5,119,894 A | 6/1992 | Crawford et al. | |
| 5,220,968 A | 6/1993 | Weber | |
| 5,230,393 A | 7/1993 | Mezey | |
| 5,245,137 A | 9/1993 | Bowman et al. | |
| 5,401,915 A | 3/1995 | Schafer | |
| 5,465,207 A | 11/1995 | Boatwright et al. | |
| 5,644,489 A | 7/1997 | Hagenbuch | |

(Continued)

OTHER PUBLICATIONS

Search Report and Written Opinion for PCT/US2006/39611 dated Dec. 12, 2007.

(Continued)

*Primary Examiner*—Jamara A Franklin

(57) ABSTRACT

The present invention is directed to a system and method that helps a freight carrier to more efficiently determine if a shipment of freight has been classified with the correct freight classification. In one embodiment, the method includes the use of a handheld communication device that allows an operator of a freight carrier's vehicle to display a description of a freight classification that has been provided by the shipper at the point of origin. The operator can then compare the displayed description to the appearance of the shipment of freight to determine if they match. If they do not match, the operator can flag the shipment of freight for reexamination at the carrier's terminal facility.

28 Claims, 9 Drawing Sheets

U.S. PATENT DOCUMENTS

| | | | |
|---|---|---|---|
| 5,650,930 A | 7/1997 | Hagenbuch | |
| 5,780,782 A | 7/1998 | O'Dea | |
| 5,805,807 A | 9/1998 | Hanson et al. | |
| 5,814,771 A | 9/1998 | Oakes et al. | |
| 5,837,945 A | 11/1998 | Cornwell et al. | |
| 5,861,580 A | 1/1999 | Moore et al. | |
| 5,917,159 A | 6/1999 | Kostiuk | |
| 5,918,989 A | 7/1999 | Stout et al. | |
| 5,933,354 A * | 8/1999 | Shimada et al. | 700/228 |
| 6,332,098 B2 | 12/2001 | Ross et al. | |
| 6,370,222 B1 | 4/2002 | Cornick, Jr. | |
| 6,549,891 B1 | 4/2003 | Rauber et al. | |
| 6,600,418 B2 | 7/2003 | Francis et al. | |
| 6,669,089 B2 | 12/2003 | Cybulski et al. | |
| 6,830,181 B1 | 12/2004 | Bennett | |
| 7,049,963 B2 * | 5/2006 | Waterhouse et al. | 340/572.1 |
| 7,183,921 B2 | 2/2007 | Bonnell et al. | |
| 7,191,942 B2 | 3/2007 | Aptekar | |
| 7,313,549 B2 | 12/2007 | Hudson | |
| 2001/0041948 A1 | 11/2001 | Ross et al. | |
| 2002/0007302 A1 | 1/2002 | Work et al. | |
| 2002/0065698 A1 | 5/2002 | Schick et al. | |
| 2002/0183890 A1 | 12/2002 | Bass et al. | |
| 2003/0036977 A1 | 2/2003 | Morse | |
| 2003/0130913 A1 | 7/2003 | Ehrman et al. | |
| 2003/0216970 A1 | 11/2003 | Vadjinia | |
| 2004/0193466 A1 | 9/2004 | Kull et al. | |
| 2005/0140511 A1 | 6/2005 | Bonnell et al. | |
| 2005/0174258 A1 | 8/2005 | Yamanouchi et al. | |
| 2006/0261164 A1 | 11/2006 | Bochicchio | |

OTHER PUBLICATIONS

Simulcast product brochure *QTLTSC with SimulCast*™ Oct. 1998.
*Reweigh Program Delivers Customer Satisfaction* The Overniter Online, 1998.
*Legal-For-Trade Lift Truck Scale Provides Instant and Accurate Weigh Verification* Weigh-Tronix press release Jun. 3, 1999.
Weigh-Tronix Lift Truck Scale for ITA Brochure, Sep. 1999.
*Weight is Money* Article Modem Materials Handling, v. 55, n. 4, p. 83, Apr. 2000.
QTLTSC with Simulcast Memorandum Jun. 1997.
Office Action for U.S. Appl. No. 11/247,525 dated Jul. 14, 2009.
"Glossary of Shipping Terms" website, posted Mar. 5, 2001.
Office Action for Reexam U.S. Appl. No. 90/008,179 dated Jul. 14, 2008.
PCT Search Report and Written Opinion for PCT/US08/60191 dated Nov. 3, 2008.

* cited by examiner

SYSTEM AND METHOD FOR SHIPPING FREIGHT

CROSS-REFERENCE TO RELATED APPLICATIONS

This application is a continuation-in-part of application Ser. No. 11/383,826 filed May 17, 2006 now abandoned which in turn, is a continuation-in-part of application Ser. No. 11/247,525 filed Oct. 11, 2005 now abandoned, which in turn, is a continuation-in-part of application Ser. No. 10/425,203 filed Apr. 28, 2003, now U.S. Pat. No. 6,983,883, which in turn, claims priority from U.S. provisional application No. 60/376,248 filed Apr. 29, 2002, the contents of which are all hereby incorporated by reference in their entirety.

FIELD OF THE INVENTION

This invention relates to a system and method for shipping freight that is useful in the freight shipment industry.

BACKGROUND OF THE INVENTION

Typically, in the freight shipment industry, shipments of freight are received from a shipper by the freight carrier, accumulated at freight terminals where they are sorted by shipment destination and then loaded onto tractor-trailer trucks for shipment. At a receiving terminal, the shipments of freight are unloaded and sorted for trans-shipment or delivery. Usually, the freight shipment is arranged on one or more pallets, and the loading and unloading is handled by lift trucks. Each shipment of freight is normally assigned an identifying number, and this number is used for tracking the freight from its origin to its destination.

Typically, the cost for shipping a commodity is dependent on several factors including the distance the shipment is moving, the weight of the shipment, the density of the commodity comprising the shipment, the degree to which the shipment is susceptible to damage, the value of the shipment, and the loadability and handling characteristics of the shipment. The last four criteria are generally used to classify the commodity into a particular freight classification. For example, the National Motor Freight Classification (NMFC) classifies commodities into 18 possible classes ranging from 50 to 500. The higher the freight classification, the higher the shipping rate for every 100 pounds of the commodity shipped.

It is generally common practice for the shipper to provide the freight carrier with a description and/or freight classification of the commodity being shipped. The freight carrier then uses this information along with other factors to determine the price for shipping the freight to its final destination. In some cases, the shipper may classify the shipment of freight in the wrong classification. As a result, the freight carrier may ship a commodity at a lower than normal shipping rate, which can result in the freight carrier not receiving full value for the services rendered. To help catch misclassified shipments, many freight carriers spot check the freight at the freight terminal prior to loading freight onto the trucks. However, spot checking is inefficient and can fail to catch many of the misclassified shipments.

Thus, there still exists a need for a method and system for determining if a shipment of freight has been correctly classified by the shipper.

BRIEF SUMMARY OF THE INVENTION

The present invention provides a system and method that helps a freight carrier to more efficiently determine if a shipment of freight has been classified with the correct freight classification. In one embodiment, the method includes the use of a handheld communication device that allows an operator of a freight carrier's vehicle to display a description of a freight classification that has been provided by the shipper at the point of origin. The operator can then compare the displayed description to the appearance of the shipment of freight to determine if they match. If they do not match, the operator can flag the shipment of freight for reexamination at the carrier's terminal facility.

In one embodiment, the freight carrier provides a vehicle onto which a piece of freight is to be loaded and transported. The freight carrier receives the shipment of freight at a point of origin (e.g., the shipper's facility). The freight carrier also receives from the shipper a shipper-designated freight classification for the piece of freight, which is input into a handheld communication device. The input of the shipper-designated freight classification is used to display a description of the shipper-designated freight classification on the handheld communication device. The operator of the vehicle can then compare at the point of origin the appearance of the piece of freight with the displayed description of the freight classification. The operator then inputs in the handheld communication device as to whether the piece of freight matches the displayed description of the freight classification. The input on whether the piece of freight matches the displayed description of the freight classification can be communicated to the carrier's terminal facility and pieces of freight that do not match can be flagged for reexamination and possible reclassification.

At the carrier's terminal, the various pieces of freight are unloaded from the vehicle and moved to various loading docks and staging areas. A communication is sent to the carrier's freight classification specialist identifying the pieces of freight needing reexamination and their location within the carrier's terminal. The freight classification specialist reexamines the piece of freight and determines if the piece of freight needs to be reclassified. A new customer invoice is generated for pieces of freight that have been reclassified. In some cases, reclassification of the piece of freight may result in a change in the shipping rate. The freight can then be loaded on the appropriate truck and shipped to its final destination.

In another embodiment, the present invention is directed to a system for shipping a piece of freight. In one embodiment, the system comprises a vehicle for transporting a piece of freight and a handheld communication device accessible to an operator of the vehicle. The handheld communication device may include an input device, a memory storage device, a display device, a wireless transmitter, and one or more executable program modules for inputting and displaying the shipper-designated freight classification, as well as for inputting whether the piece of freight matches the displayed description of the freight classification. In one embodiment, one of the executable program modules is configured to cooperate with the wireless transmitter and is operable for communicating with a remote receiving site, such as the carrier's terminal, the input as to whether the appearance of the piece of freight matches the displayed description of the freight classification. This input can then be used by the carrier terminal's computer system to send a message, such as an email, to the freight classification specialist that identifies the piece of freight in need of reexamination.

In one embodiment, the handheld communication device includes one or more of the following executable programs: a first executable program module cooperating with the input device and operable for receiving input of a shipper-designated freight classification for the piece of freight; a second executable program module cooperating with the display device and operable for displaying on the handheld communication device a description of the shipper-designated freight classification; a third executable program module cooperating with the input device and operable for receiving input as to whether the appearance of the piece of freight matches the displayed description of the freight classification, and a fourth executable program module cooperating with the wireless transmitter and operable for communicating with a remote site the input as to whether the appearance of the piece of freight matches the displayed description of the freight classification, and combinations thereof.

Thus, the present invention provides a system and method that provides an effective and efficient method of determining if a shipment of freight has been correctly classified by the shipper.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention is shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
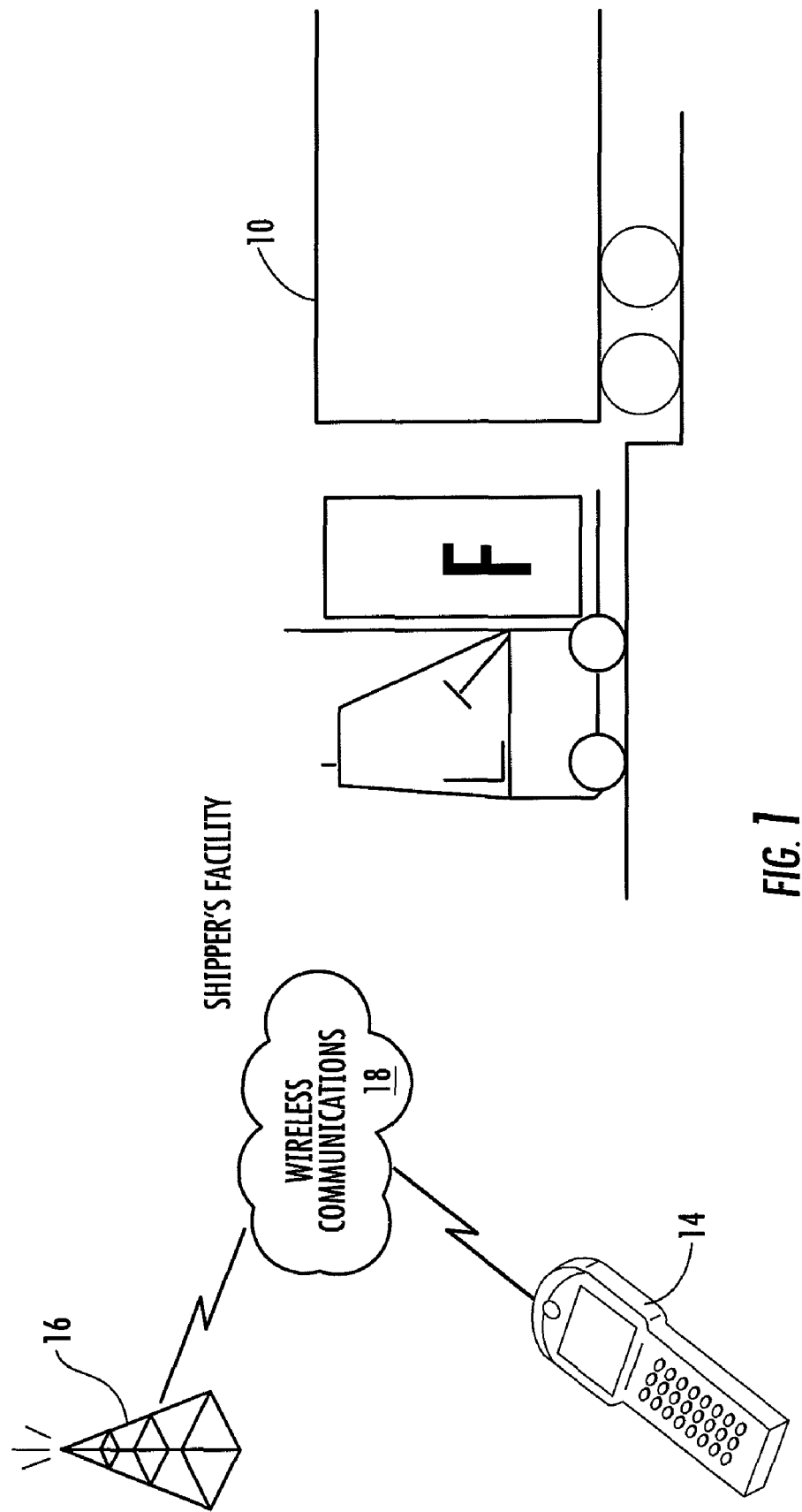
FIG. 1 is a schematic illustration of a system and method of shipping freight that is in accordance with one aspect of the invention.

FIG. 1 is a schematic illustration of a system and method of shipping freight that helps a freight carrier to more effectively ascertain whether a piece of freight has been classified with a correct freight classification. In one embodiment, as illustrated in FIG. 1, for example, a shipment of freight F is received by the freight carrier at the shipper's loading dock. At the loading dock, the freight carrier provides a vehicle 10, such as a truck, onto which the piece of freight F is to be loaded and transported. The operator of the vehicle (e.g., the freight carrier's truck driver) uses a handheld communication device 14 which is configured to receive input of the shipper-designated freight classification for the piece of freight. Upon receiving input of the shipper-designated freight classification, the handheld communication device 14 is configured to display a description of commodities fitting the freight classification. The operator of the vehicle 10 can use the displayed description of the shipper-designated freight classification to visually inspect the piece of freight F and compare the visual appearance of the piece of freight with the displayed description of the freight classification. The operator of the vehicle can then input into the handheld communication device whether the piece of freight matches the displayed description of the classification. In the event, the visual appearance of the piece of freight does not match the displayed description of the shipper-designated freight classification, the piece of freight can be flagged to be reexamined upon arriving at the freight carrier's terminal.

The shipper-designated freight classification can conform to commonly used freight classifications, such as the National Motor Freight Classification (NMFC), for example. The freight classification may be in the form of words, letters, numbers, symbols, and combinations thereof. For example, the NMFC utilizes a series of numerical values ranging from 50 to 500 wherein each numerical value corresponds to a specific class of commodities.

The shipper can provide the shipper-designated freight classification for the piece of freight at any time between requesting shipment and arrival of the freight carrier's vehicle at the shipper's facility. In one embodiment, the shipper may provide the shipper-designated freight classification to the freight carrier at the time the shipper requests transport of the piece of freight. In some cases, the shipper may provide the shipper-designated freight classification to the freight carrier at the time the freight carrier's vehicle arrives at the shipper's facility to pick up the piece of freight for shipment. For example, the shipper may provide the shipper-designated freight classification directly to the operator of the freight carrier's vehicle, for example on the bill of lading.

In one embodiment, the shipper may provide the freight classification along with other information that is relevant to the shipment of the piece of freight, such as destination, weight, dimensions of the shipment of freight, and the like.

Figure 2:
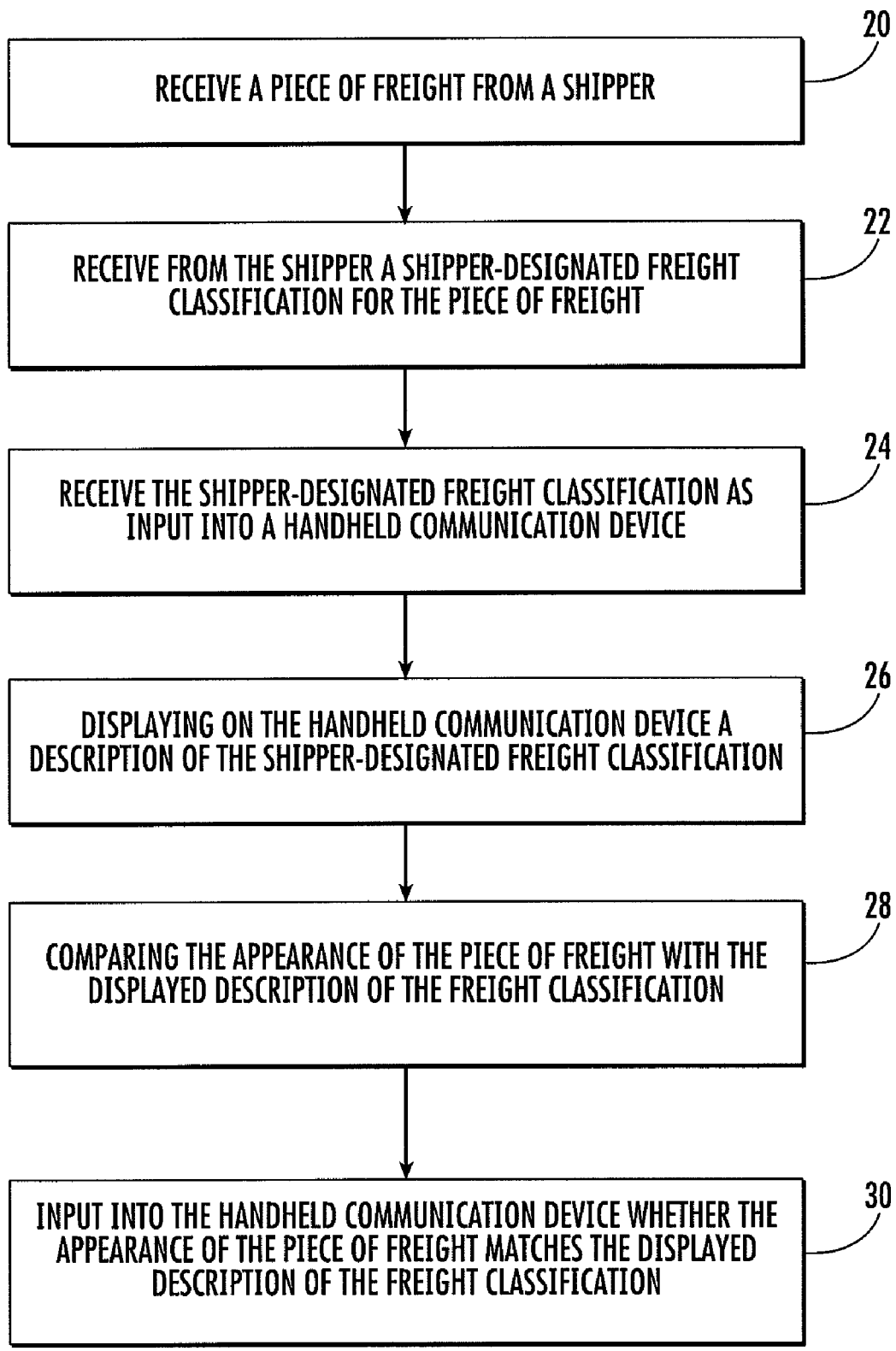
FIG. 2 is a flow chart that illustrates an exemplary method for using the handheld communication device to determine if a piece of freight has been correctly classified.

FIG. 2 is a flow chart that depicts an exemplary process for ascertaining if the shipper has provided the correct freight classification for the piece of freight that is in accordance with one embodiment of the invention. In step 20, the freight carrier receives a piece of freight from the shipper. At step 22, the freight carrier receives a shipper-designated freight classification for the piece of freight. As noted above, the shipper-designated freight classification can be received by the freight carrier before or at the time the carrier receives the shipment of freight from the shipper.

In step 24, the shipper-designated freight classification is received as input into the handheld communication device. In one embodiment, the input may be received from the freight carrier as a communication that is wirelessly communicated to the handheld communication. In some embodiments, the input of the shipper-designated freight carrier classification may be manually inputted into the handheld communication, such as by manually inputting the freight classification into the handheld communication device. In step 26, the handheld communication device is configured to display a description of the shipper-designated freight classification that is viewable on the handheld communication device. For example, if the shipper-designated freight classification is directed to a class of commodities that includes nails, bolts, screws, etc., the handheld communication device can be configured to provide a generic description of the classification such as nails, bolts, screws, etc. The operator can then use the displayed description of the freight classification to compare the appearance of the shipment of freight to the displayed description at step 28. In step 30, information as to whether the visual appearance of the piece of freight matches the displayed description of the shipper-designated freight classification can be input into the handheld communication device. As explained more fully below, this information can be used to flag a piece of freight for reexamination and possible reclassification.

The handheld communication device may include, or be in communication with, a wireless transmitter/receiver that facilitates wireless communication between the handheld communication device and a remote receiving site, such as the freight carrier's central office or terminal facility. For example, in FIG. 1, the handheld communication device 14 may include, or be in communication with, a wireless transmitter 16 that is capable of wireless communications with a remote receiving site via wireless network 18. In one embodiment, the handheld communication device can communicate information to a remote receiving site that includes the input on whether the shipper-designated freight classification matches the visual appearance of the piece of freight. The communication can then be used to alert appropriate personnel at the freight carrier's facility that the piece of freight will need to be reexamined and possibly reclassified. In some embodiments, the wireless network may also be used to communicate information from the freight carrier's central office or terminal facility to the handheld communication device. For example, in one embodiment, the handheld communication device may receive input of the shipper-designated freight classification via a wireless communication from the carrier's terminal.

The wireless transmitter may also be operable for receiving and communicating additional information from the remote receiving site to the carrier's vehicle operator. For example, the wireless transmitter may be configured to receive information from the carrier's dispatcher, such as route scheduling, directions, pick-up locations, etc. As a result, the system permits the carrier facility to instantly update or optimize the vehicle operator's route. The wireless transmitter may be included in one or more of the handheld communication, or a stand-alone device that is disposed on the carrier's vehicle 10, for example. In one embodiment, the wireless transmitter may be capable of wireless communications via a wide area network, local area network, a cellular network, or a combination thereof.

Figure 3:
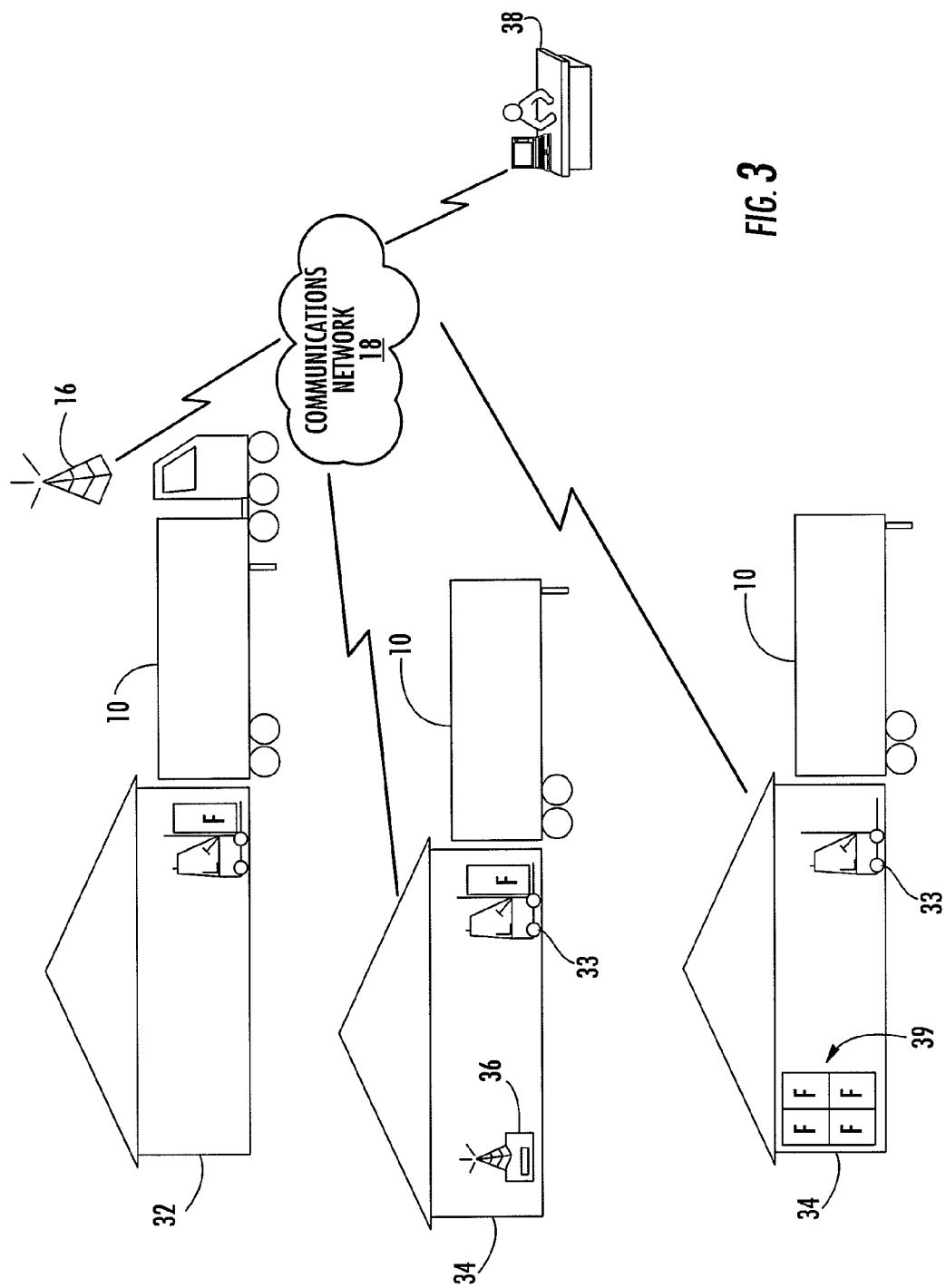
FIG. 3 is a schematic illustration of a distribution system for shipping freight and determining if the piece of freight has been correctly classified.

As shown in FIG. 3, a shipment of freight is initially received by the freight carrier at the shipper's facility 32. The information as to whether the visual appearance of the piece of freight matches the shipper-designated freight classification is inputted into the handheld communication device as described in connection with FIG. 2. The freight carrier's distribution system may include one or more freight terminals 34, which may be located in the same or different cites. Although FIG. 3 illustrates two freight terminals 34, it should be understood that in connection with the discussion below the two freight terminals in FIG. 3 represent the same freight terminal at different points in the process of communicating information and unloading the freight from the carrier's vehicle. It should also be understood that a typical freight distribution system may include many freight terminals at various different cities. In one embodiment, the information may be communicated from the handheld communication device to an input of base computer 36, which may be located at the carrier's terminal facility or at a central office, for example. In one embodiment, the information can first be communicated to the base computer 36 at the carrier's terminal 34, which may then communicate the information to a central computer 38, or vice versa.

In one embodiment, information indicating that the piece of freight may need reexamination may be communicated to a classification specialist at the freight carrier's terminal. In some embodiments, the communication may also identify the vehicle transporting the piece of freight to the carrier's terminal, the location of the piece of freight within the carrier's terminal, the identity and location of the vehicle at the carrier's terminal on to which the piece of freight is to be loaded, and combinations thereof. In one embodiment, the communication may also include the estimated time at which the vehicle onto which the piece of freight is to be loaded is scheduled to depart. In one embodiment, when the carrier's vehicle operator arrives at the carrier's terminal with the thus collected freight shipments, a fork lift 33 operator unloads the truck 10 and places one or more pieces of freight at various locations 39 within the carrier's terminal, such as another trailer or to a particular holding and staging area within the carrier's terminal. The location 39 of a piece of freight needing reexamination within the carrier's terminal may also be communicated to the freight classification specialist to help facilitate quick and efficient location of the piece of freight within the carrier's terminal. The location of the piece of freight can be provided to a freight classification specialist by the fork lift operator, the carrier's scheduler, or by the carrier's computer system.

Figure 4:
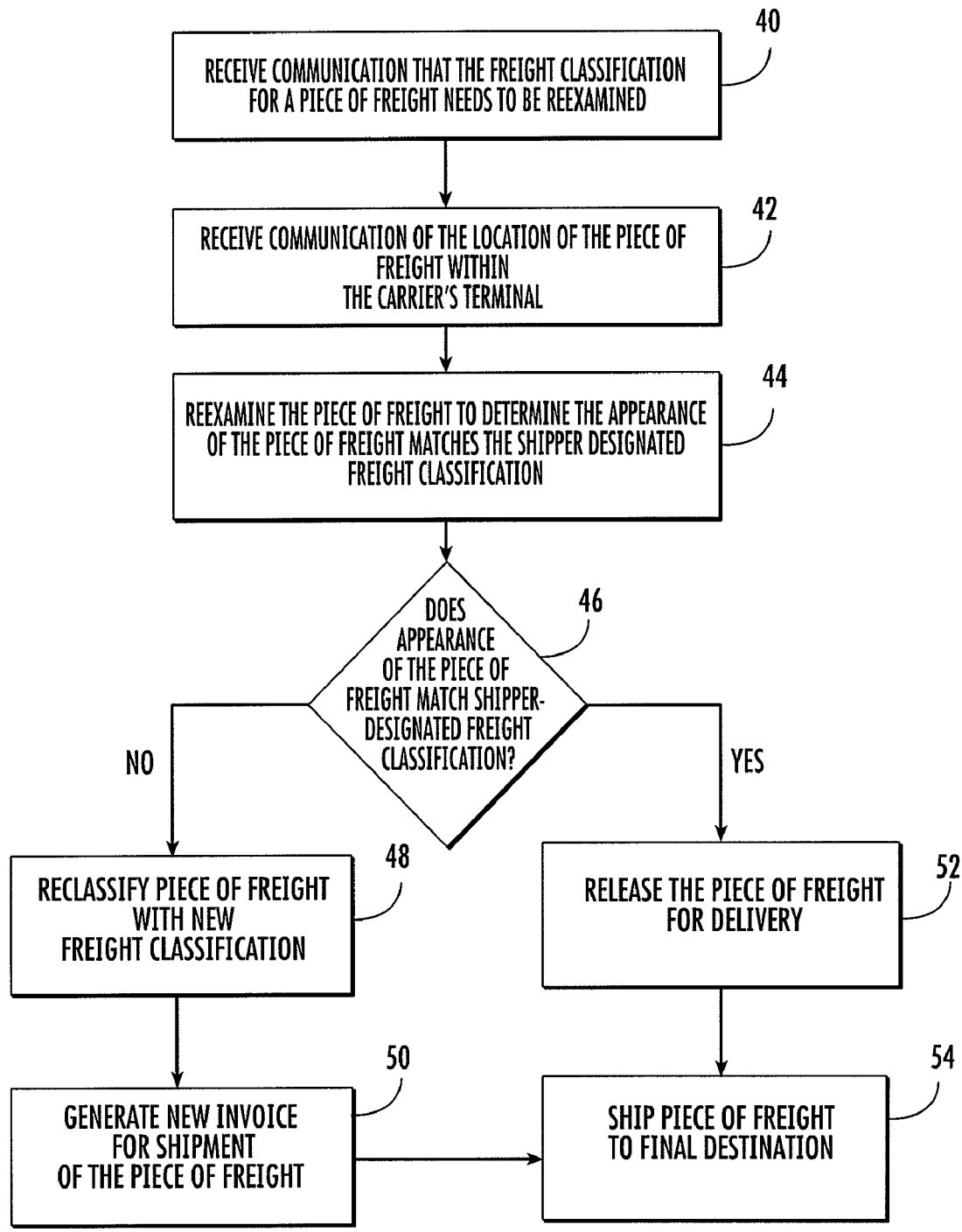
FIG. 4 is a flow chart that illustrates an exemplary method that can be used to reexamine the classification of a piece of freight prior to shipment to its final destination.

With reference to FIG. 4, a flow chart representing an exemplary process for handling a piece of freight that has been flagged for reclassification is illustrated. In step 40, the freight carrier receives a communication from the handheld communication device that the freight classification for a piece of freight needs to be reexamined by personnel at the carrier's terminal, such as the freight classification specialist. In one embodiment, the communication can be automatically communicated to a freight classification specialist from the freight carrier's computer system via email. At step 42, the location of the piece of freight within the carrier's terminal can also be communicated to the freight classification specialist. For example, in one embodiment, a fork lift operator may unload the piece of freight off of the vehicle and move it onto another vehicle or to a particular location within the carrier's terminal. This location may be communicated to the freight classification specialist so that pieces of freight needing reexamination can be located within the terminal. In some embodiments, the information sent in steps 40 and 42 may be sent to the freight classification specialist in a single communication or in separate communications.

In step 44, the freight classification specialist examines a piece of freight that has been flagged for reexamination by the vehicle operator. If the reexamination of the piece of freight determines that the visual appearance piece of freight does not match the description of the shipper-designated freight classification, the freight classification specialist will examine the piece of freight and determine the correct freight classification for the piece of freight at step 48. The freight specialist will thereafter change the freight classification in the terminal's computer system, and based on this change, generate a new customer invoice for the piece of freight at step 50. In step 54 the reclassified piece of freight is loaded onto an outgoing truck and shipped to its final destination. In some embodiments, reclassification of the piece of freight may result in a change in the shipping rate for the piece of freight. If the reexamination of the piece of freight determines the shipper-designated freight classification is correct, the piece of freight is released by the freight classification specialist at step 52. Thereafter, the piece of freight is loaded onto an outgoing truck and shipped to its final destination.

Figure 5:
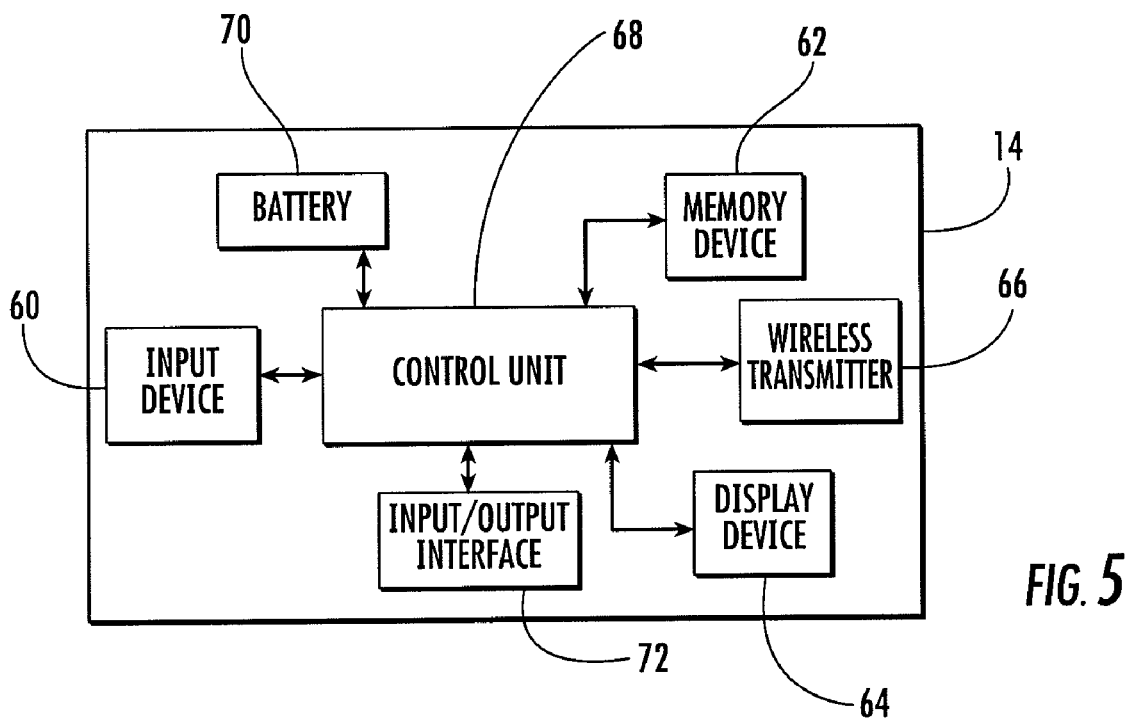
FIG. 5 is a schematic illustration of a handheld communication device that is in accordance with one embodiment of the invention.

With reference to FIG. 5, a schematic illustration of an exemplary handheld communication device 14 is illustrated. The handheld communication device 14 may include an input device 60, such as a user interface, a memory storage device 62, a display device 64 that is capable of displaying text messages, menus, and the like, and a first communication interface, such as a wireless transmitter 66 that is configured for wireless communication. The handheld communication device may also include a control unit 68 and a power supply such as a battery 70. In some embodiments, the handheld communication device may also include an Input/Output (I/O) 72 interface. As shown in FIG. 5, the various components of the handheld communication device, such as the interfaces, processor, memory, display element, and battery are typically operatively connected to one another.

The input device 60 typically comprises a user interface that permits an operator of the device to input information and instructions/commands into the handheld communication device 14. In one embodiment the input device may include one or more buttons or switches that are configured to allow a user to input instructions and select among various menu options. In some embodiments, the input device may include a touch sensitive keypad that allows a user to operate the handheld communication device by applying pressure to a button within the keypad. The input device may also provide a means through which a user may recall stored information for viewing on the display device. For example, in one embodiment, the operator of the vehicle may input the shipper-designated freight classification to thereby recall the description of the freight classification for display on the display device.

The first interface device 66 may comprise an interface that facilitates wireless communication between the handheld communication device and a remote receiving site and additional devices in the system. In one embodiment, the first interface is a wireless transmitter comprising a cellular network interface that permits communications between the handheld communication device and the remote receiving site. As noted above, wireless transmitter may be capable of wireless communications via a wide area network, land area network, a cellular network, or a combination thereof. In another embodiment, the first interface may comprise an RF communication interface that permits communications between the handheld communication device and a wireless transmitter on the vehicle via a wireless network using a Bluetooth protocol, for example. In other embodiments, handheld communication device may be able to communicate with a wireless transmitter on the vehicle via a wireless RF network using a protocol such as Bluetooth, and communicate with the remote receiving facility using a cellular network. In other embodiments, the handheld communication device may be configured for wireless communication of both data, such as text data, and audible data, such as telephonic communications.

In one embodiment, the handheld communication device includes a memory storage device 62 that can be configured to store computer readable program code, freight classification descriptions, and identifying information for the piece of freight that has been inputted into the handheld communication device by the vehicle operator. In one embodiment, the memory storage device comprises flash memory. Flash memory refers generally to a type of nonvolatile memory that can be erased and reprogrammed in units of memory called blocks. The capacity of the memory component can be varied depending upon the desired amount of data that can be stored before downloading the data into an external computer or similar device. In some embodiments the capacity of the memory storage device may comprise 64K, 128K, 256K, or 512K, 1 Gig, 2 Gig, or greater memory blocks. In this embodiment, the memory storage device may be configured to store freight classification descriptions, inputted information on whether the visual appearance of the piece of freight matches the shipper-designated freight classification, and identifying information for the piece of freight. In one embodiment, the stored information can be wirelessly transmitted to the remote receiving site or another device at an appropriate time. Alternatively, the stored information can be retained until the vehicle operator returns to the terminal and then downloads the stored information into the terminal's computer system.

The handheld communication device includes a display device 64 that is capable of displaying descriptions of freight classifications, various menu options, inputted information, route scheduling, maps, etc. In one embodiment, the display device may also be capable of displaying information sent to the vehicle operator from the carrier's terminal or central office. For example, in one embodiment, the handheld communication device can be configured to receive dispatch information transmitted from a central freight terminal about freight shipments requiring pick-up and to display the same to the operator of the vehicle via the display device.

The control unit 68 may comprise a microprocessor or microcontroller configured to perform dedicated functions such as controlling the handheld communication device and executing program modules that are capable of one or more of receiving, storing and transmitting inputted information. The microcontroller may also include memory components such as RAM, EEPROM, and PROM, internal timers, and I/O port interfaces. The control unit may include an internal memory component (not shown) that may be an integral part of the control unit. In some embodiments, the control unit may include executable program modules embedded within the internal memory component of the control unit.

The one embodiment, I/O interface 72 may comprise wired or wireless connectivity means such as 12C, ACCESS.bus, RS-232, universal serial bus (USB), IEE-488(GPIB), LAN/Internet protocols such as TCP/IP, wireless means such as infrared (IR) communication, 802.11x, and Bluetooth, etc. In some embodiments, the I/O interface may comprise a combination of wired and wireless connectivity means. In some embodiments, the I/O interface 72 may comprise an RF communication interface having an RFID transceiver that is adapted to allow the handheld communication device to send and/or retrieve data from an RF transceiver, such as an RF tag. In some embodiments, the RFID communication interface may also be adapted to write or rewrite information onto an RFID tag. The RFID transceiver may perform read only or read-write communications depending on the application. In some embodiments, the handheld communication device may also include a scanner (not shown) that is capable of reading 2-D bar codes. The ability to read 2-D bar codes with the handheld communication device may permit the carrier vehicle operator to recall information that is encoded into a 2-D bar code that is associated with a piece of freight.

The handheld communication device also includes computer-readable program codes for performing one or more operations and/or functions. The computer-readable program codes may include program modules, various algorithms, rules, and combinations thereof that facilitate the performance of their respective functions. The computer-readable program code may be in the form of software, hardware, and combinations thereof. The computer-readable code may be stored on the memory storage device, the control unit, or a combination thereof.

In one embodiment the computer-readable program code includes a plurality of executable portions that are capable of performing one or more of the following: receiving input of a shipper-designated freight classification for the piece of freight; displaying on the handheld communication device a description of the shipper-designated freight classification; receiving input as to whether the appearance of the piece of freight matches the displayed description of the freight classification; and wirelessly communicating with a remote receiving site the input as to whether the appearance of the piece of freight matches the displayed description of the freight classification.

In one particular embodiment, the handheld communication device includes a first executable program module cooperating with the input device and operable for receiving input of a shipper-designated freight classification for the piece of freight, a second executable program module cooperating with the display device and operable for displaying on the handheld communication device a description of the shipper-designated freight classification, a third executable program module cooperating with the input device and operable for receiving input as to whether the appearance of the piece of freight matches the displayed description of the freight classification, and a fourth executable program module cooperating with the wireless transmitter and operable for communicating with a remote site the input as to whether the appearance of the piece of freight matches the displayed description of the freight classification.

The handheld communication device may also include a fifth executable program module that cooperates with the input device of the handheld communication device and is operable for receiving input of identifying information for the piece of freight. For example, the handheld communication device can be configured to receive a wide variety of identifying information that is specific to the piece of freight. In the context of the invention, the term "identifying information" includes information that is associated with a specific piece or pieces of freight. Identifying information may include identification of the shipper, an identification code or number for the shipment of freight, the number of pieces in the shipment, the consignee name and address, the number of pieces in the shipment, estimated value of the freight shipment, description and classification of the shipment, and if applicable, handling instructions, such as an MSDS, stated weight of the shipment of freight, identification of the truck driver, digital image of the freight, date and time, etc. The freight specific information may also include a unique freight bill number, which is often referred to as a "pro number". The pro number for a shipment of freight may be generated and pre-assigned to a shipment of freight prior to the arrival of the carrier's truck driver at the shipper's facility. Alternatively, the pro number can be generated at the shipper's facility. In one embodiment, the identification code or number for the shipment of freight is the pro number.

Figure 6:
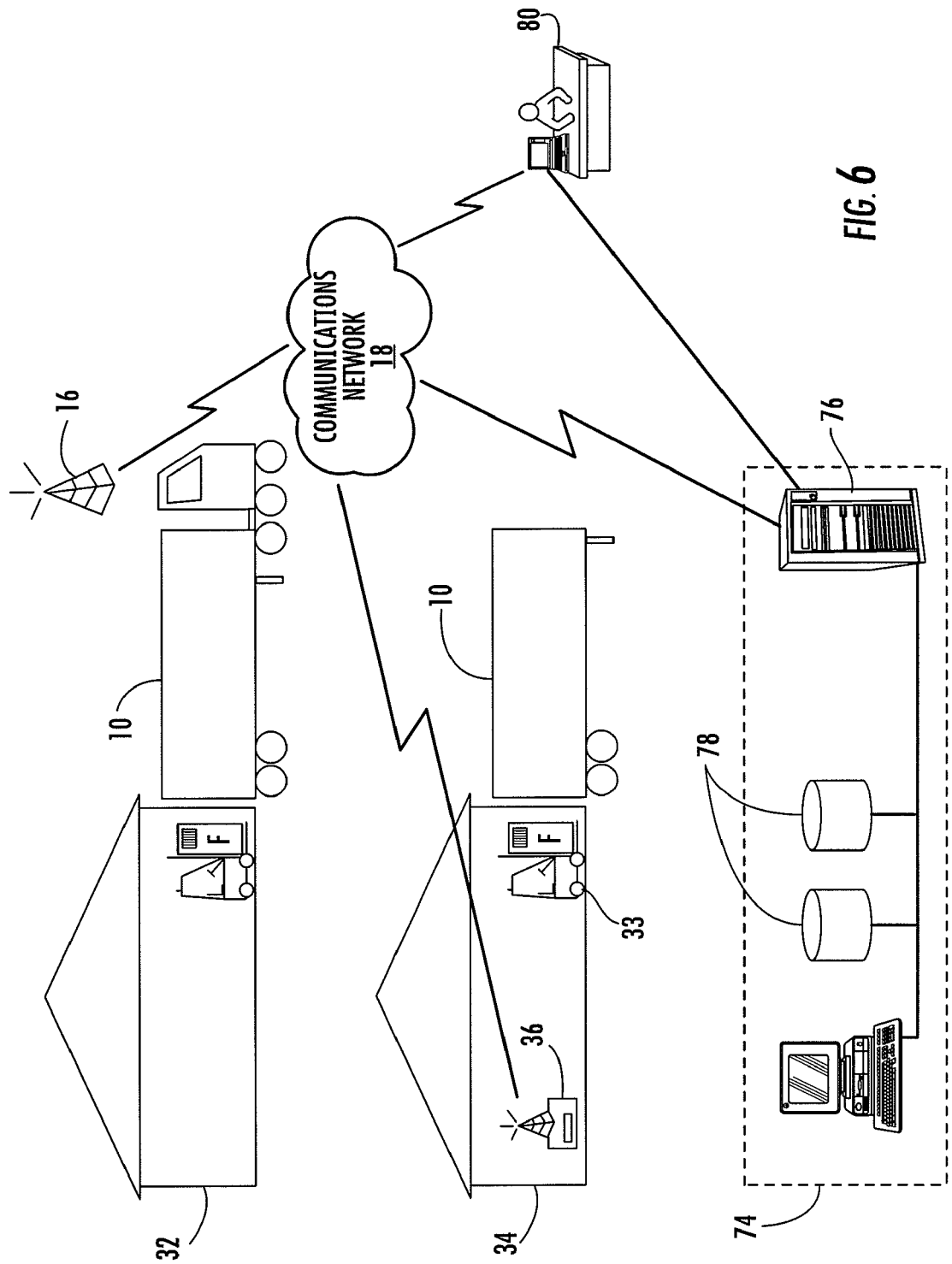
FIG. 6 is a schematic illustration of a distribution system for shipping freight and identifying a piece of freight.

In some embodiments, the handheld communication device may include a sixth executable program module that cooperates with the wireless transmitter and is operable for communicating the identifying information for a piece of freight to the remote receiving site. In this regard, FIG. 6 illustrates a freight distribution system wherein the system and method of the present invention includes a wireless transmitter 16 that is operable for communicating information from the carrier's vehicle via wireless network 18 to a remote receiving site, such as the carrier's terminal facility 34 or the carrier's central office 74. For example, upon receiving the shipment of freight, the vehicle operator inputs information regarding the shipment of freight into the handheld communication device at the shipper's facility 32. The wireless transmitter 16 can then communicate the inputted information regarding the shipment of freight to the carrier's central computer 76. The identifying information can be stored in a database 78. In one embodiment, the information regarding the carrier operator's status, route, and the like may also be communicated to the central computer. Alternatively, the identifying information can be communicated to a base computer 36 at the carrier's terminal. The base computer 36 may then communicate the information to a central computer 76. As discussed in greater detail below, the identifying information may also be encoded onto a label, such as bar code or RDID tag that is attached to the piece of freight by the vehicle operator.

In one embodiment, the information can also be communicated from the wireless transmitter 16 or the central computer 76 to appropriate personnel, such as the carrier's scheduler 80. The scheduler may be located at the carrier's freight terminal or at a central location. The carrier's scheduler can use the thus transmitted information for scheduling available resources for handling the shipment. For example, the central computer system may include an executable scheduling program module which is used by the carrier's scheduling personnel in assigning the freight shipment to an outbound truck having the appropriate destination for the shipment. The scheduler can use the transmitted identifying information to determine a delivery schedule and shipping route for the shipment of freight before the freight reaches the carrier's terminal. As a result, inefficiencies that may be associated with reviewing shipping documents and scheduling shipping routes may be reduced or eliminated. The carrier's dispatcher personnel may also use information for determining the status of the carrier's vehicle operator and redirecting the operator to various shipper's facilities as needed.

In one embodiment, when the carrier's vehicle operator arrives at the carrier's terminal with the thus collected freight shipments, the system and method of the present invention can be used to capture the actual weight of each piece of freight in the shipment. For example, as each piece of freight is handled by a lift truck 33 at the carrier's origin terminal 34, the lift truck operator scans the label for that piece of freight and the weight of the piece of freight can be determined. The lift truck operator may, for example, use a handheld device to read identifying information encoded on a label that is affixed to a piece of freight. The lift truck operator can also obtain the actual weight of the freight shipment from a weighing device provided on the lift truck. This weight information can be transmitted to a remote computer (not shown) that is disposed on the lift truck or to base computer 36 where it can be associated with the identifying information, such as the identification code or number, and stored. The weight information can also be made available to the central computer 76 in the central office 74.

In another embodiment, the system can also include an executable program module, such as an unloading module, that is configured to cooperate with the freight carrier's computer system and to instruct the forklift operator on where to take the freight within the terminal. For example, upon receiving the piece of freight, the unloading module can be configured to retrieve information from the scheduling module on where the freight should be delivered, e.g., to another trailer at the loading dock or to a particular holding and staging area within the terminal facility. In some embodiments, the terminal's computer system can also communicate the location of the piece of freight to the freight classification specialist as noted above.

The system can also include a loading module to facilitate loading a trailer with freight. The loading module includes means for receiving information identifying the trailer into which the lift truck loads the piece of freight, and means for associating this trailer identifying information with a maximum load limit for that trailer. Each time a lift truck delivers a piece of freight to that trailer, the accumulated load weight for that trailer is determined by adding the weight of that piece of freight to the weight of all previously loaded pieces of freight. When the accumulated load weight reaches a predetermined level, in relation to the maximum load limit, a signal is generated that can be used to display information to the operator of the lift truck concerning the progress of loading, or alert the operator that the maximum load limit has been reached. The information identifying the trailer into which the piece of freight is loaded can be received in any of several ways. For example, the lift truck operator can use the scanner to scan a trailer identifying bar code located at the entrance to the trailer where the piece of freight is to be loaded. Alternatively, the trailer identification may be preassigned to a piece of freight and associated with the identifying information in the central computer or database. In this case, the scanning of the encode label will serve not only to identify the piece of freight, but can also recall the identity of the trailer into which the piece of freight is to be loaded. Alternatively, the trailer identification can be entered manually into the central computer by the operator of the lift truck using an input device associated with the computer, such as a touch screen, keyboard or pen.

In a further embodiment, the handheld communication device may also include an optional imaging program module for capturing image information about the freight shipment. In one embodiment a digital camera may be incorporated into the handheld communication device and can be used to capture a digital photograph of the freight shipment. For example, when the components of the handheld communication device are integrated into a single handheld unit, this handheld unit can also include a digital camera. Imaging data representing a digital photograph of the freight shipment can be transmitted to the central computer along with the other information obtained about the freight shipment. This information can be used by the central office as proof of shipment received, state of the shipment, as well as to enable reviewing the shipment for appropriate product classification.

In some embodiments, the handheld communication device used by the carrier's truck driver may also suitably include a global positioning satellite (GPS) transmitter module for transmitting information about the location of the freight pickup truck back to the central office for use by a scheduling module. This will allow the central office to determine when the pickup truck can be expected back at the central office with the freight shipments.

Figure 7:
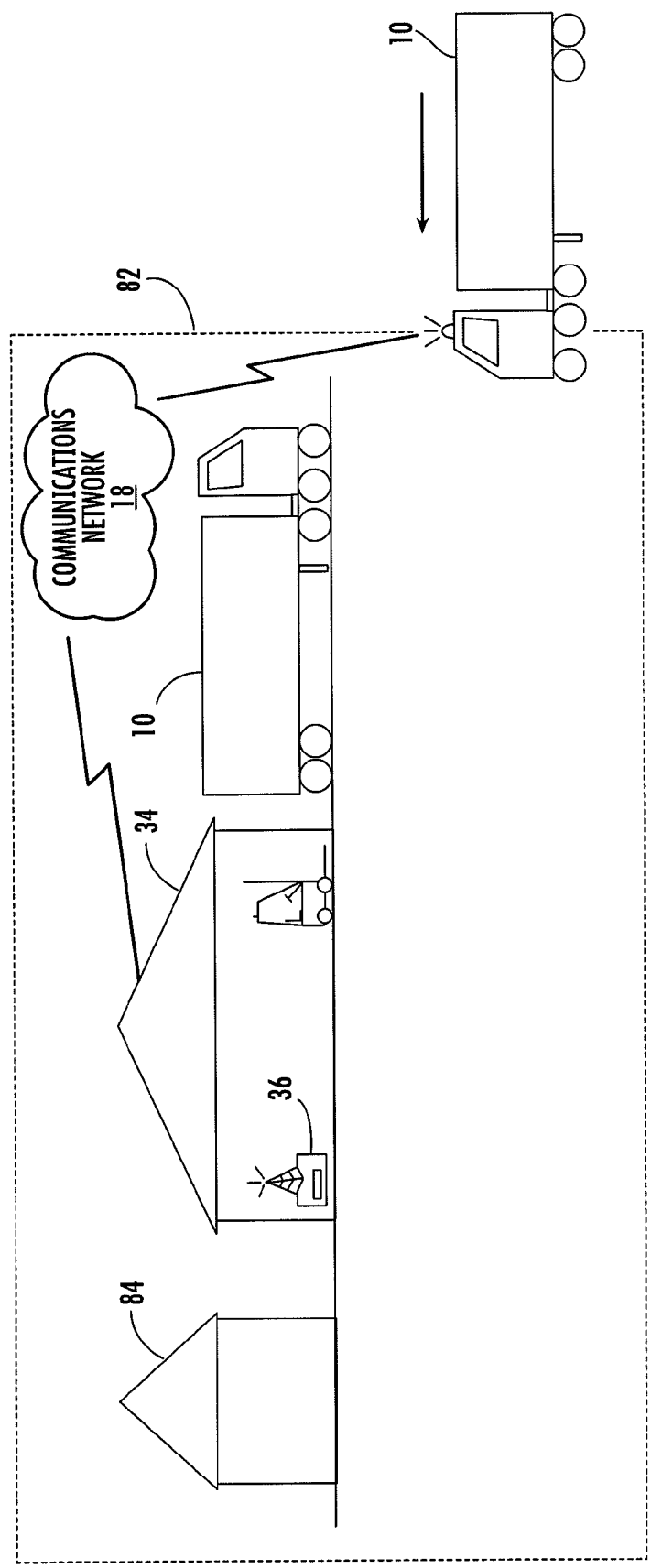
FIG. 7 is a schematic illustration of a system in which a Geo-Fence has been created around the perimeter of the carrier's terminal facility.

In one embodiment, the handheld communication device may also include an executable maintenance program module to assist in monitoring maintenance of the carrier's vehicle. In this embodiment, the handheld communication device can be in communication with an onboard diagnostic computer that monitors and transfers information regarding the status of the vehicle such as, for example, the number of hours of operation, or any status messages generated by sensors on the vehicle or by a engine control computer module for the vehicle. This information can be communicated via the handheld communication device to the base computer or the central computer for scheduling maintenance of the vehicle or for dispatching a service call. In this regard, FIG. 7 illustrates an embodiment of the invention in which the communication handheld communication device includes an executable program module that is configured for communicating with the vehicle onboard diagnostic computer. The onboard diagnostic computer can alert the handheld communication device in the event the vehicle is in need of maintenance. The handheld communication device can then communicate this information to the carrier's facility. The information regarding the status of the vehicle can be used for scheduling maintenance of the vehicle, or for recalling the vehicle to the carrier's facility in the event the vehicle is in need of immediate attention.

In one embodiment, the maintenance module may also include GPS capabilities, such as being in communication with a GPS device, so that the position of the vehicle with respect to the carrier's facilities can be determined. In this embodiment, a virtual "Geo-Fence" may created around the perimeter of the carrier's facility. In FIG. 7, the Geo-Fence is represented by the dashed lines represented by reference number 82. If the maintenance module communicates information to the terminal facility that indicates the vehicle 10 is in need of maintenance, the terminal's base computer 36 or central computer can schedule maintenance for the vehicle 10. In one embodiment, upon the vehicle 10 entering the perimeter of Geo-Fence 82, the base computer 36 can send a communication to the handheld communication device that is received as input and instructs the operator to bring the vehicle to a maintenance facility 84. In some embodiments, the input may first instruct the operator of the vehicle to drop-off the trail at a loading/unloading dock before bring the vehicle to the maintenance facility. The Geo-Fence may be created at some predetermined distance surrounding the carrier's terminal facility, such as 1 mile, 5 miles, or 10 miles away from the carrier's terminal facility.

In one particular embodiment, the handheld communication device or the vehicle may include a GPS device that is configured to cooperate with an executable maintenance program module. In one embodiment, the maintenance module may also cooperate with the wireless transmitter and be operable for communicating with a remote receiving site the position of the vehicle with respect to the carrier's terminal facility. When the vehicle the vehicle is within a predetermined distance of the central freight terminal, e.g., less than 5 miles, the remote receiving site can be configured to input information into the handheld communication device that instructs the operator of the vehicle to bring the vehicle to a maintenance facility.

Figure 8:
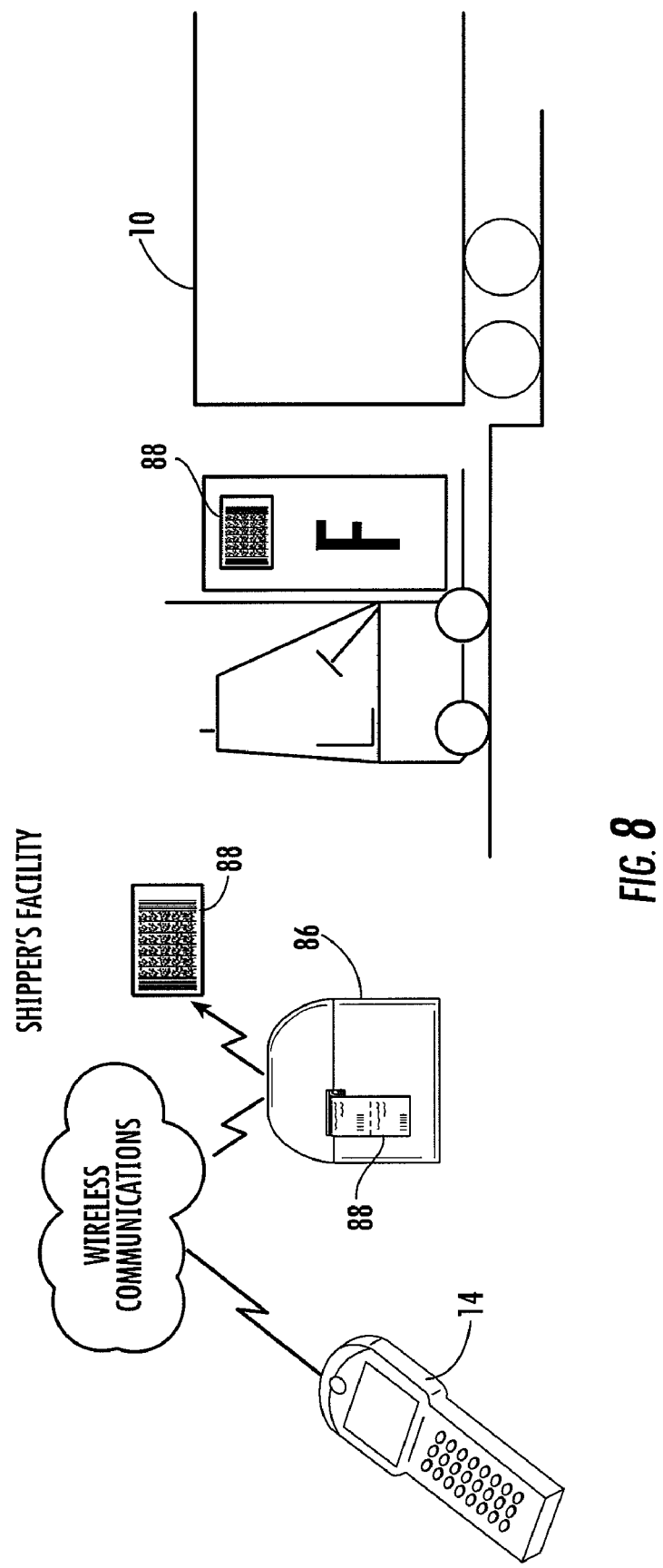
FIG. 8 is a schematic illustration of a system for tracking freight that includes an encoding device for encoding identifying information onto a label that can be adhered to a piece of freight.
Figure 9:
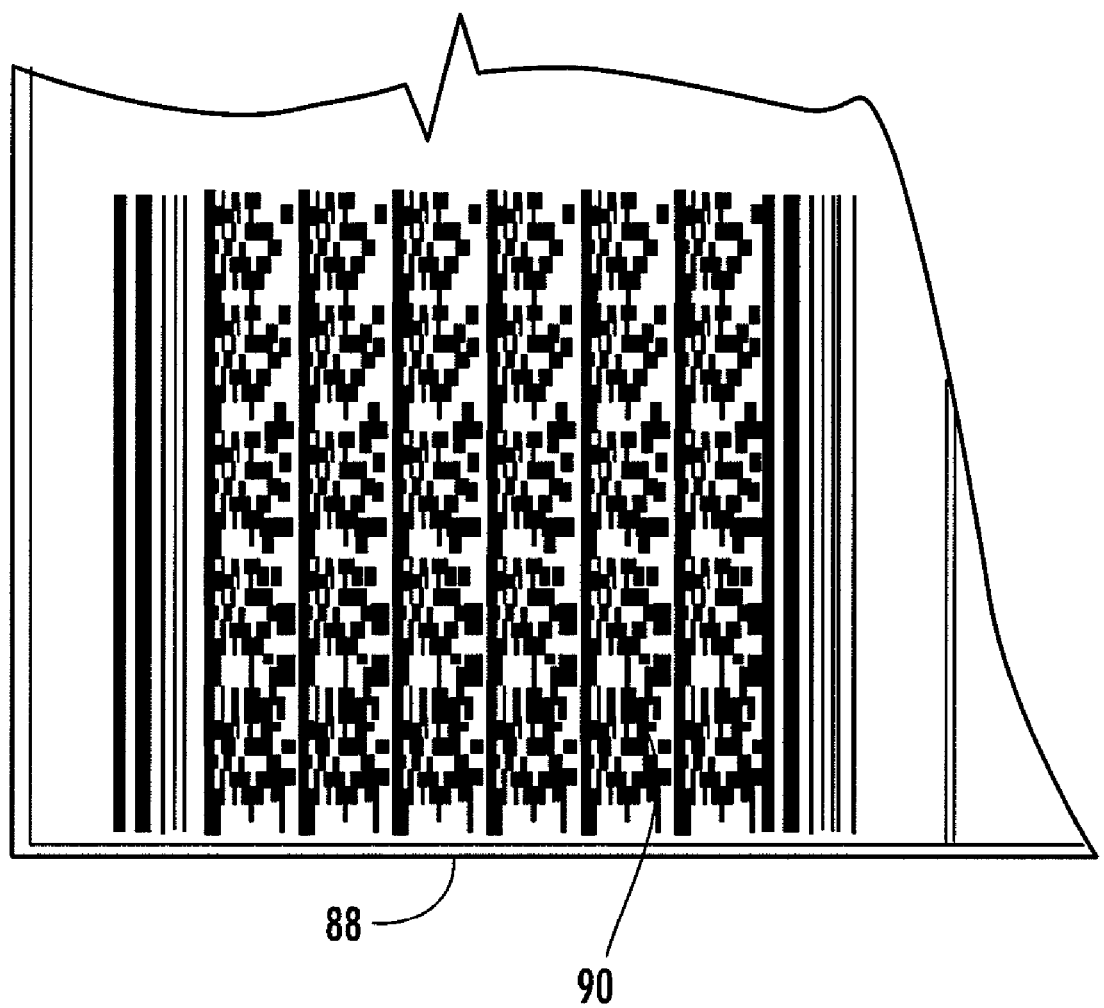
FIG. 9 is a graphical illustration of a 2-D bar code.

As shown in FIG. 8, the handheld communication device 14 can also be configured to communicate identifying information for a piece of freight to an encoding device 86. In one embodiment, the encoding device 86 may be disposed on the carrier's vehicle 10. In another embodiment, the encoding device and the handheld communication device may be integrated into a single device. The encoding device 86 is operable for receiving the identifying information for a piece of freight from the handheld communication device and encoding the identifying information onto a label 88. In one embodiment, the encoding device is configured to encode the label with an identification code or number and at least one additional data field selected from the group consisting of: a point of origin; a final destination; weight of the piece of freight; special handling instructions for the piece of freight; classification for the piece of freight; number of items associated with the shipment; estimated value of the piece of freight; and digital image of the piece of freight. The thus encoded label can then be attached to the piece of freight. The label permits the identifying information to travel with the shipment of freight as it moves from the point of origin to its final destination.

After receiving the identifying information, the encoding device can encode it onto a label from which the identity information can be retrieved by scanning the label. In one embodiment, the label includes an adhesive surface that permits it to be affixed to a piece of the freight. The label may be available on a roll comprising a release liner to which a plurality of labels are releasably adhered. In one embodiment, the label comprises a means whereby the identifying information can travel with the freight and be recalled at any point along the freight's shipping route. Preferably, the identifying information is encoded on the label in the form of a machine readable code. In one embodiment, the encoded label comprises an RFID tag, a 2-D bar code, a combination of a 1-D bar code and an RFID tag, and combinations thereof. For example, in some embodiments, the encoding device includes an RF transmitter that is operable for writing the information onto an RFID tag. In other embodiments, the encoding device may comprise a printer that is capable of encoding the information onto the label in the form of a 2-D bar code. In one embodiment, the label comprises a "smart label" wherein an RFID tag is incorporated into a label. In some embodiments, the encoding device may be configured to encode information onto the label using both printing means and RF writing means.

In one embodiment, the label comprises an RFID tag that is capable of storing and transmitting the identifying information. An RFID system typically comprises a transponder, generally referred to as a "tag", that can receive and send information between the tag and the encoding device or between the tag and a reader, such as a scanner. The RFID tag typically includes a microchip for storing information and an antenna for communicating with a reader and/or writer. After receiving the identifying information from the data entry device, the encoding device can write the information onto the label by sending an RF signal to the RFID tag. The transponder used in an RFID system may be either "passive" or "active." A passive transponder can be a simple resonant circuit, including an inductive coil and a capacitor. Passive transponders are generally powered by the carrier signal transmitted from the reader or the encoding device. Active transponders, on the other hand, generally include transistors or other active circuitry, and require their own battery source. In one embodiment, the RFID tag may comprise a write once read many tag (WORM), which is configured to be written or programmed once and only once and then read many times throughout the shipment of the freight. In other embodiments, the RFID tag may comprise a writeable tag that is capable of being written and rewritten many times.

In one embodiment, the identifying information may be encoded onto the label by printing a machine readable code, such as a 2-D bar code onto the label. 2-D barcodes can contain data in both the horizontal and in the vertical axis. A 2-D symbol may be one of two types of machine-readable symbols: a Matrix Symbol or a stacked symbol. In contrast to linear bar codes, such as universal product codes, 2-D barcodes generally include the ability for high data content, small size, data efficiency and error correction capability. 2-D barcode symbologies are able to encode up to several thousand characters of machine readable data. As a result, a 2-D barcode provides the freedom of recalling information that is specific to a particular piece of freight without the need to access an external database. FIG. 8 illustrates an exemplary label 88 having a 2-D bar code 90 that may be used in accordance with the invention. Common types of 2-D barcodes that may be used in the practice of the invention include PDF417, Data Matrix, MaxiCode, and combinations thereof.

Stacked bar codes, such as PDF417, are like a set of linear bar codes literally stacked on top of each other. Stacked barcode symbologies can be read with a variety of readers, such as laser scanners, cameras, or CCDs. Matrix bar codes typically comprise a pattern of cells that can be square, hexagonal, or circular in shape. Matrix symbols can be read by a camera or CCD bar code scanner. Matrix barcodes are typically able to provide higher data densities than stacked codes. Data Matrix and MaxiCode bar codes are the best examples of a matrix code.

In an alternative embodiment, the vehicle operator may be provided with a supply of pre-encoded labels that have been encoded with the identifying information prior to the operator arriving at the shipper's facility. In this embodiment, a shipper may supply the identifying information to the carrier at the time of scheduling the freight shipment. The carrier in turn, would then encode the identifying information onto the label. This may be done at a central location for the carrier or at one of the carrier's terminal facilities. The carrier would then supply the encoded labels to the vehicle operator prior to the operator's departure to the shipper's facility. In one embodiment, the shipper may provide the identifying information to the carrier via an internet portal, such as a website, or by calling the carrier's scheduling department.

In one embodiment, the handheld communication device is capable of wireless communications with the encoding device. In some embodiments, the handheld communication device and the encoding device may include one or more input/output (I/O) interfaces. The I/O interfaces may comprise wired or wireless connectivity means such as 12C, ACCESS.bus, RS-232, universal serial bus (USB), IEE-488 (GPIB), LAN/Internet protocols such as TCP/IP, wireless means such as infrared (IR) communication, 802.11x, and Bluetooth, etc. In some embodiments, the I/O interface may comprise a combination of wired and wireless connectivity means. In a preferred embodiment, the handheld communication device and the encoding device may be operably connected to each other via a wireless network, using communications protocols such as Bluetooth.

In a further embodiment, the system may include a standalone device, such as an external communications interface that is disposed on the carrier's vehicle and is capable of communicating with the remote receiving site and/or the handheld communication device. In one embodiment, the communication interface device may have multi-functional capabilities. For example, the communication interface device may include diagnostic capabilities, GPS capabilities, vehicle maintenance diagnostic capabilities, electronic driver logs, storage capabilities, and the like. In one embodiment, the communication interface may include one or more program modules for executing these various capabilities. In one particular embodiment, the system can include a maintenance program module to assist in monitoring maintenance of the carrier's vehicle. In this embodiment, the communication interface can be in communication with an onboard diagnostic computer that monitors and transfer information regarding the status of the vehicle such as, for example, the number of hours of operation, or any status messages generated by sensors on the vehicle or by a engine control computer module for the vehicle. This information can be used by the central computer for scheduling routine preventive maintenance of the vehicle, for dispatching a service call, or for use in connection with a Geo-Fence as previously discussed.

Additionally, the communication interface can also include a human resources module for collecting and monitoring information for use by the human resources department of the freight carrier. The human resources module may, for example, require the vehicle operator to log in each time he begins operating the vehicle. In this way, the system can track information about which driver handled each piece of freight in a shipment, driver operating time for the vehicle, number of freight pieces handled, or other information. The collected information can be transmitted to the central computer for use in generating payroll information, work assignments, or for historical purposes. Additionally, the human resources can include a module for monitoring the driving time and maintaining a hourly log for the vehicle's operator.

The system and method of the present invention are designed to be integrated into the existing freight tracking and invoicing infrastructure of a freight carrier, and supplements the carrier's existing computerized invoicing software. The following description of a typical freight carrier's freight tracking and invoicing functions should provide contextual understanding of how the present invention is implemented and used.

A freight shipment cycle begins when the freight carrier receives a request from a shipper, by telephone or internet, for a freight pickup. The freight carrier will assign a shipment number (pro number) to this shipment, and will instruct a vehicle operator to pick up the shipment. Alternatively, a pro number can be generated by the vehicle operator when he is at the shipper's facility. Typically, the following minimum information is obtained: consignee name and address, stated weight of the shipment, payment information, and shipper-designated freight classification. This information may be provided by telephone, or more typically on a bill of lading prepared by the shipper and given to the truck driver for the freight carrier. Upon receipt of this information, the vehicle operator will input the information including the shipper-designated freight classification into the handheld communication device. Typically, a shipment number (pro number) is also assigned to the shipment of freight and input into the handheld communication device.

The handheld communication device uses the inputted information to display a description of the shipper-designated freight classification. The vehicle operator then compares the appearance of the piece of freight to the description of the freight classification. If the visual appearance of the piece of freight and the description of the of the freight classification do not match, the piece of freight is flagged for reexamination by a freight classification specialist at the carrier's terminal facility. In one embodiment, identifying information is communicated to the encoding device, which then encodes the information on a label. The vehicle operator then attaches the encoded label to the piece of freight. If the shipment of freight comprises two or more pieces, a separate label can be encoded for each piece.

The piece of freight is loaded onto the carrier's vehicle and the vehicle operator drives to his next pick-up point and repeats the cycle for the next piece of freight. Once the vehicle operator has completed all his scheduled pick-ups, the vehicle returns to the carrier's terminal.

At the carrier's terminal, the various pieces of freight are unloaded from the vehicle and moved to various loading docks and staging areas. A communication is sent to the carrier's freight classification specialist identifying the pieces of freight needing reexamination and their location within the carrier's terminal. The freight classification specialist reexamines the piece of freight and determines if the piece of freight needs to be reclassified. A new customer invoice is generated for pieces of freight that have been reclassified. The freight can then be loaded on the appropriate truck and shipped to its final destination.

Additionally, the freight carrier's accounting system has all the information needed to generate an invoice for the shipment with the correct freight classification. The conventional system will generate an invoice at a suitable time using, as a basis for the shipping charges, the stated weight provided by the shipper. The present invention integrates with the existing accounting and invoicing system and provides the capability to update the data record for each shipment or pro number with a real-time actual weight for the shipment. The invoicing module in the central computer uses the thus-captured identifying information and real-time actual weight data to generate customer invoices. The invoices are based upon the actual weight for each piece of freight shipped, rather than an estimate of the shipment weight. The freight carrier's standard accounting software can utilize the information to generate the customer invoices using customer information stored in a database.

Information maintained by the system of the present invention can be made available to authorized users through conventional hard-wired networks, wireless networks, virtual private networks, through web access, or other suitable networking methods.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for shipping freight comprising:
a vehicle for transporting a piece of freight; and
a handheld communication device accessible to an operator of the vehicle, the handheld communication device including
an input device,
a memory storage device,
a display device,
a wireless transmitter,
a first executable program module cooperating with the input device and operable for receiving input of a shipper-designated freight classification for the piece of freight,
a second executable program module cooperating with the display device and operable for displaying on the handheld communication device a description of the shipper-designated freight classification,
a third executable program module cooperating with the input device and operable for receiving input as to whether the appearance of the piece of freight matches the displayed description of the freight classification, and
a fourth executable program module cooperating with the wireless transmitter and operable for communicating with a remote receiving site the input as to whether the appearance of the piece of freight matches the displayed description of the freight classification.

2. The system of claim 1, wherein the wireless transmitter is capable of wireless communications via a wide area network, local area network, cellular network, or a combination thereof.

3. The system of claim 1, wherein the description of the freight classification is stored on the memory storage device.

4. The system of claim 1, including an input device at a central freight terminal communicatively connected to the remote receiving site, a freight classification module communicating with the input device at the central freight terminal for receiving information on whether the appearance of the piece of freight matches the displayed description of the freight classification.

5. The system of claim 1, further comprising a fifth executable program module cooperating with the input device of the handheld communication device and operable for receiving input of identifying information for the piece of freight.

6. The system of claim 5, wherein the identifying information comprises an identification code or number and at least one additional data field selected from the group consisting of: a point of origin; a final destination; weight of the piece of freight, special handling instructions for the piece of freight; classification for the piece of freight; number of items associated with the shipment; estimated value of the piece of freight; and digital image of the piece of freight.

7. The system of claim 6, wherein the wireless transmitter is operable for transmitting to and receiving from a remote receiving site, the memory device having a storage location for receiving and storing the identifying information input, and a sixth executable program module for transmitting the stored identifying information for a piece of freight to the remote receiving site via the transmitter.

8. The system of claim 1, further comprising a label capable of being affixed to the piece of freight and an encoding device operable for receiving identifying information for a piece of freight which has been input to the handheld communication device and encoding the identifying information onto the label.

9. The system of claim 8, wherein the encoding device includes a printer operable for writing the identifying information as a 2-D bar code.

10. The system of claim 8, wherein the label comprises a write once, read many RFID tag, and the encoding device includes a radio frequency transmitter operable for writing the identifying information to the RFID tag.

11. The system of claim 1, wherein the handheld communication device also includes a GPS module, and includes stored executable instructions in the memory storage device for also transmitting GPS location information to the remote receiving site.

12. The system of claim 1, wherein the remote receiving site is a central freight terminal, and wherein the handheld communication device includes means for receiving information transmitted from the central freight terminal and displaying the same on the display device.

13. The system of claim 12, wherein one or more of the handheld communication device or the vehicle include a GPS device, and wherein the handheld communication device includes a maintenance module comprising an executable program module cooperating with the wireless transmitter and operable for communicating with a remote receiving site to receive input of scheduled maintenance for the vehicle when the vehicle is within a predetermined distance of the central freight terminal.

14. A method for shipping freight, the method comprising:
receiving from a shipper at a point of origin a piece of freight to be shipped by a freight carrier;
also receiving from the shipper a shipper-designated freight classification for the piece of freight;
receiving input in a handheld communication device of the shipper-designated freight classification;
in response to the input of the shipper-designated freight classification, displaying on the handheld communication device a description of the shipper-designated freight classification;
comparing at the point of origin the appearance of the piece of freight with the displayed description of the freight classification;
receiving input in the handheld communication device as to whether the piece of freight matches the displayed description of the freight classification; and
transporting the piece of freight to a second location.

15. The method of claim 14, additionally including wirelessly transmitting the input of whether the piece of freight matches the displayed description of the freight classification to a remote receiving site.

16. The method of claim 15, wherein the step of wirelessly transmitting the input comprises transmitting via a wide area network, local area network, cellular network, or a combination thereof.

17. The method of claim 14, further comprising the step of sending a message to personnel at the second location that the piece of freight needs to be reexamined in the event the appearance of the piece of freight does not match the displayed description of the freight classification.

18. The method of claim 17, wherein the message is sent via email.

19. The method of claim 17, further comprising the steps of unloading the piece of freight off of a vehicle at the second location; and
reexamining the appearance of the piece of freight at the second location to determine if the shipper-designated freight classification for the piece of freight needs to be changed.

20. The method of claim 19, further comprising the steps of reclassifying the piece of freight and updating a customer invoice based on the change of freight classification for the piece of freight.

21. The method of claim 20, wherein a shipping rate for the piece of freight is changed as a result of a change in freight classification.

22. The method of claim 14, further comprising the step of reclassifying the piece of freight at the second location if the appearance of the piece of freight does not match the displayed description of the freight classification.

23. The method of claim 14, wherein the handheld communication device includes a stored description of freight classifications.

24. The method of claim 14, wherein the description of the freight classification is wirelessly communicated to the handheld communication device.

25. The method of claim 24, wherein the description of the freight classification is wirelessly transmitted to the handheld communication device.

26. The method of claim 25, wherein the description of the freight classification is uploaded to the handheld communication device prior to the step of receiving the piece of freight from the shipper.

27. The method of claim 14, wherein the freight classification is based on the National Motor Freight Classification.

28. The method of claim 14, including receiving dispatch information transmitted from a central freight terminal about freight shipments requiring pick-up and displaying the same to the operator of the vehicle via a display device on the handheld communication device.

* * * * *